(12) United States Patent
Nozaki

(10) Patent No.: US 7,519,290 B2
(45) Date of Patent: Apr. 14, 2009

(54) ELECTRONIC CAMERA

(75) Inventor: Hirotake Nozaki, Tokyo (JP)

(73) Assignee: Nikon Corporation, Tokyo (JP)

( * ) Notice: Subject to any disclaimer, the term of this patent is extended or adjusted under 35 U.S.C. 154(b) by 390 days.

(21) Appl. No.: 11/324,217

(22) Filed: Jan. 4, 2006

(65) Prior Publication Data

US 2006/0193627 A1    Aug. 31, 2006

(30) Foreign Application Priority Data

Jan. 7, 2005    (JP)    ............... 2005-002238

(51) Int. Cl.
*G03B 21/00*    (2006.01)
(52) U.S. Cl. ............... 396/430; 396/242; 396/243; 396/439; 396/448; 348/333.1; 353/121
(58) Field of Classification Search ............... 396/430, 396/349, 448, 299, 298, 541, 242, 243; 353/30, 353/39, 71, 121, 85; 348/211.7, 333.1
See application file for complete search history.

(56) References Cited

U.S. PATENT DOCUMENTS

| 4,571,043 | A | * | 2/1986 | Kobayashi et al. | ......... 396/336 |
| 5,528,297 | A | * | 6/1996 | Seegert et al. | ............. 348/333.1 |
| 6,036,376 | A | * | 3/2000 | Owashi et al. | ............... 396/349 |
| 6,525,750 | B1 | * | 2/2003 | Knox | ............... 345/30 |
| 6,626,543 | B2 | * | 9/2003 | Derryberry | ............... 353/119 |
| 6,727,954 | B1 | * | 4/2004 | Okada et al. | ............... 348/374 |
| 6,830,345 | B2 | * | 12/2004 | Kamm et al. | ............... 353/122 |
| 6,930,669 | B2 | * | 8/2005 | Weiner et al. | ............... 345/156 |
| 7,188,958 | B2 | * | 3/2007 | Zoidis et al. | ............... 353/119 |
| 7,233,356 | B2 | * | 6/2007 | Nagao | ............... 348/333.02 |
| 7,321,763 | B2 | * | 1/2008 | Tanaka et al. | ............... 455/414.1 |
| 7,369,762 | B2 | * | 5/2008 | Tanaka | ............... 396/419 |
| 2003/0210229 | A1 | | 11/2003 | Nishimura et al. | |

FOREIGN PATENT DOCUMENTS

| JP | 5-137039 | 6/1993 |
| JP | 8-146512 | 6/1996 |
| JP | 2000-92358 | 3/2000 |
| JP | 2001-42415 | 2/2001 |
| JP | 2002-171428 | 6/2002 |
| JP | 2004-120374 | 4/2004 |

* cited by examiner

*Primary Examiner*—W. B. Perkey
*Assistant Examiner*—Linda B Smith
(74) *Attorney, Agent, or Firm*—Staas & Halsey LLP

(57) ABSTRACT

An electronic camera includes: an image sensor that captures an image of a subject and outputs image data; a projection device that projects an image based upon image data; a single mode switching operation member operated to select a mode; and a control device that selects a photographing operation mode in which image data output by the image sensor are saved into a recording medium or a projection operation mode in which an image is projected by the projection device based upon image data read out from the recording medium in correspondence to a position to which the single mode switching operation member is operated.

13 Claims, 5 Drawing Sheets

BARRIER CLOSE

BARRIER HALF OPEN

BARRIER FULLY OPEN

ELECTRONIC CAMERA

INCORPORATION BY REFERENCE

The disclosure of the following priority application is herein incorporated by reference:

Japanese Patent Application No. 2005-002238 filed Jan. 7, 2005

BACKGROUND OF THE INVENTION

1. Field of the Invention

The present invention relates to an electronic camera that includes a projection device capable of projecting information such as images.

2. Description of Related Art

There is an electronic camera known in the related art which is equipped with the projector function (see Japanese Laid Open Patent Publication No. H8-146512). In the electronic camera disclosed in Japanese Laid Open Patent Publication No. H8-146512, the projection device is engaged in operation in response to an operation of a projection mode switch or a video play button.

SUMMARY OF THE INVENTION

The operability of an electronic camera that includes an additional switch to be operated to start up the projection device is considerably compromised since the addition of a new operation member is bound to complicate camera operations or cause an erroneous operation readily.

According to the 1st aspect of the invention, an electronic camera, comprises: an image sensor that captures an image of a subject and outputs image data; a projection device that projects an image based upon image data; a single mode switching operation member operated to select a mode; and a control device that selects a photographing operation mode in which image data output by the image sensor are saved into a recording medium or a projection operation mode in which an image is projected by the projection device based upon image data read out from the recording medium in correspondence to a position to which the single mode switching operation member is operated.

According to the 2nd aspect of the invention, in the electronic camera according to the 1st aspect, it is preferred that: there is further provided a display device at which an image is displayed based upon image data; a reproduction operation mode in which an image is displayed at the display device based upon image data read out from the recording medium is also available; and the control device selects one of the three operation modes in correspondence to the position to which the single mode switching operation member is operated.

According to the 3rd aspect of the invention, in the electronic camera according to the 2nd aspect, it is preferred that at the single mode switching operation member, operation positions corresponding to the projection operation mode and the reproduction operation mode are set next to each other.

According to the 4th aspect of the invention, in the electronic camera according to the 1st aspect, it is preferred that: there is further provided a photographic lens; the single mode switching operation member is constituted with a protective member that protects the photographic lens and a projection window through which projected light from the projection device is output; and the control device selects the projection operation mode when the protective member is operated to a position at which the projection window is no longer protected, and selects the photographing operation mode when the protective member is operated to a position at which the photographic lens is no longer protected.

According to the 5th aspect of the invention, in the electronic camera according to the 4th aspect, it is preferred that the control device selects the projection operation mode when the protective member is operated to a position at which the projection window is no longer protected but the photographic lens is still protected, and selects the photographing operation mode when the protective member is operated to a position at which neither the projection window nor the photographic lens is protected.

According to the 6th aspect of the invention, an electronic camera, comprises: an image sensor that captures an image of a subject and outputs image data; a projection device that projects an image based upon image data; a display device at which an image is displayed based upon image data; an operation member; and a control device that selects a photographing operation mode in which image data output by the image sensor are saved in a recording medium or a reproduction operation mode in which an image is either projected via the projection device or displayed at the display device based upon image data read out from the recording medium. And the control device selects an ON or OFF state for projection by the projection device and selects an ON or OFF state for display at the display device in response to an operation signal output from the operation member while the reproduction operation mode is currently selected.

According to the 7th aspect of the invention, in the electronic camera according to the 6th aspect, it is preferred that the operation member is operated to selects an ON or OFF state for display at the display device when a mode other than the reproduction operation mode is selected.

According to the 8th aspect of the invention, in the electronic camera according to the 6th aspect, it is preferred that each time the operation member is operated, the control device selects an OFF state for projection by the projection device and an ON state for display at the display device, an ON state for projection by the projection device and an OFF state for display at the display device, or an OFF state for projection by the projection device and an OFF state for display at the display device.

According to the 9th aspect of the invention, in the electronic camera according to the 1st aspect, it is preferred that: there is further provided a photographic lens and a drive device that drives the photographic lens; and as a switchover to the projection operation mode is detected, the control device controls the drive device to retract the photographic lens.

According to the 10th aspect of the invention, in the electronic camera according to the 9th aspect, it is preferred that as a movement or an operation of the single mode switching operation member to an operation position corresponding to the projection operation mode is detected, the control device controls the drive device so as to retract the photographic lens.

According to the 11th aspect of the invention, in the electronic camera according to the 4th aspect, it is preferred that: there is further provided a photographic lens and a drive device that drives the photographic lens; and as a movement of the protective member from the position at which the photographic lens is not protected to the position at which the photographic lens is protected is detected, the control device controls the drive device so as to retract the photographic lens.

DETAILED DESCRIPTION OF PREFERRED EMBODIMENTS

The following is an explanation of preferred embodiments of the present invention, given in reference to the drawings.

First Embodiment

Figure 1:
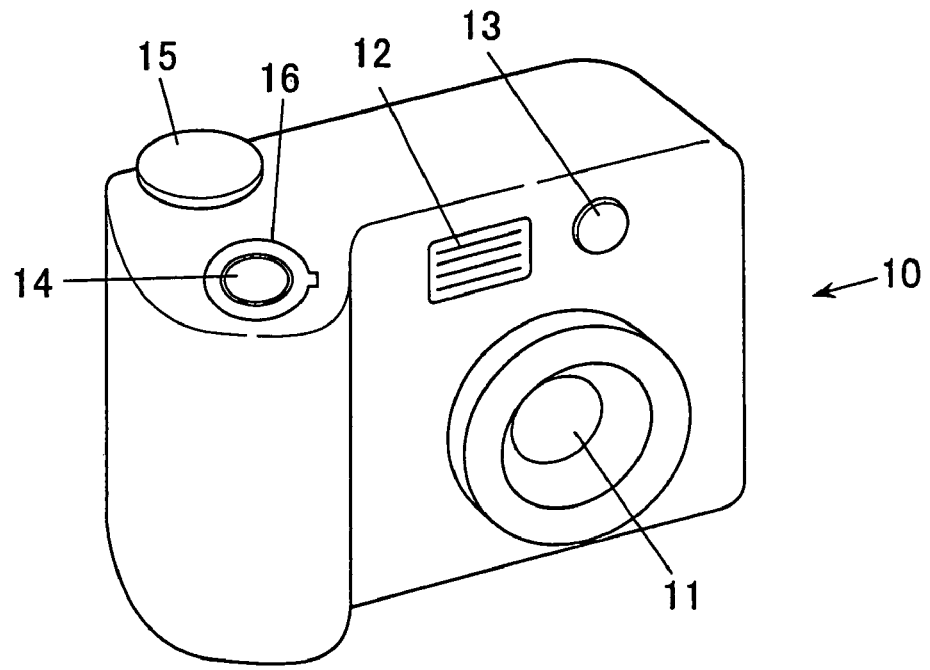
FIG. 1 is a perspective of the electronic camera equipped with a projector, which is achieved in a first embodiment of the present invention, viewed from the front side.

FIG. 1 is a perspective of the electronic camera equipped with a projector, which is achieved in the first embodiment of the present invention, viewed from the front side. As shown in FIG. 1, a photographic lens 11, an illuminating light window 12 and a projection window 13 are disposed at the front of an electronic camera 10 equipped with a projector. At the top surface of the electronic camera 10 equipped with a projector, a shutter release button 14, a mode selector dial 15 and a main switch 16 are disposed.

Figure 2:
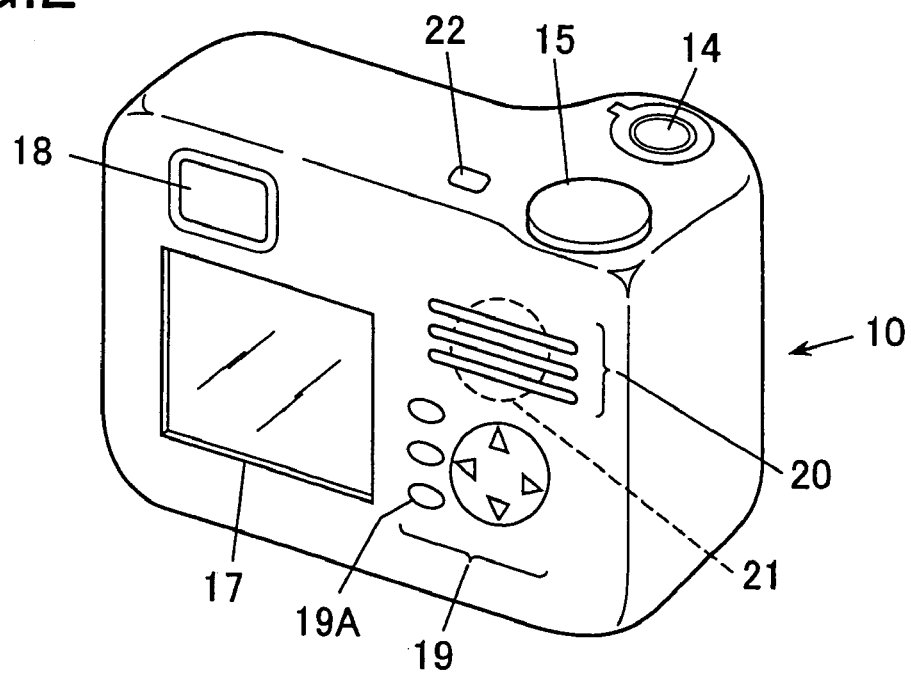
FIG. 2 is a perspective of the electronic camera equipped with a projector in FIG. 1, viewed from the rear side.

FIG. 2 is a perspective of the electronic camera equipped with a projector in FIG. 1, viewed from the rear side. As shown in FIG. 2, a liquid crystal display unit 17, a viewfinder 18, operation members 19 and speaker holes 20 are disposed at the rear surface of the electronic camera 10 equipped with a projector. An index 22 is disposed next to the mode selector dial 15.

The electronic camera 10 equipped with a projector includes a projection device which projects an optical image. The projection device projects information such as images through the projection window 13 toward a screen or the like set up to the front of the electronic camera 10 equipped with a projector. In addition, the electronic camera 10 equipped with a projector includes a built-in speaker 21 disposed behind the speaker holes 20 so as to reproduce information such as sound toward the rear of the electronic camera 10.

An electronic camera normally includes a mode switching operation member operated to switch from a photographing mode to a reproduction mode or vice versa. In the photographing mode, a subject image is photographed and the photographed image data are saved into a recording medium or the like. It is to be noted that the term "image capturing" may be used instead of the term "photographing", and thus, the photographing mode may be alternatively referred to as an image capturing mode. In the photographing mode, audio data collected via a built-in microphone (not shown) disposed together with the speaker 21 behind the speaker holes 20 can also be saved in the recording medium or the like. In the reproduction mode, an image reproduced based upon photographed image data read out from the recording medium or the like is displayed at the liquid crystal display unit 17.

In the first embodiment, the mode switching operation member described above is also used to switch the electronic camera 10 equipped with a projector to a projection mode in order to project image information through the projection window 13. The mode selector dial 15 is equivalent to the mode switching operation member in the embodiment.

Figure 8:
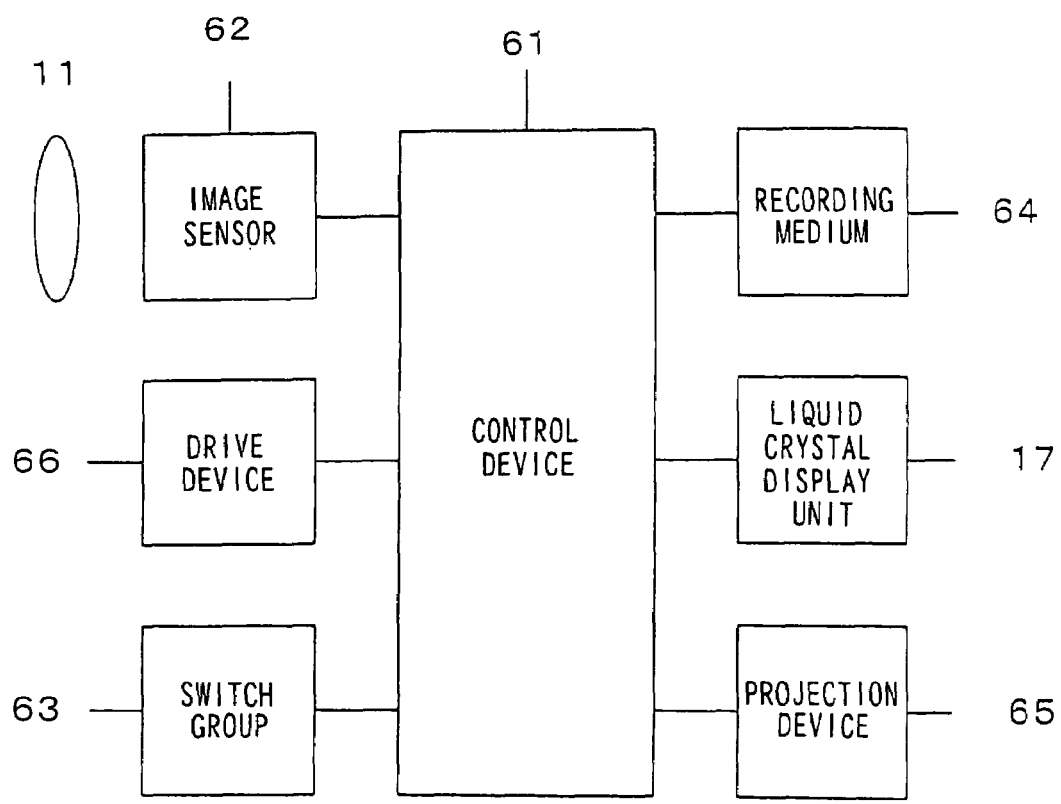
FIG. 8 is a block diagram of an electronic camera equipped with a projector.

FIG. 8 is a block diagram of the electronic camera 10 equipped with a projector. A control device 61, constituted with a microprocessor and its peripheral circuits, controls an image sensor 62, a recording medium 64, the liquid crystal display unit 17, a projection device 65, a drive device 66 and the like based upon various signals received from a switch group 63.

The image sensor 62, constituted with an image capturing element such as a CCD, captures an image of a subject via the photographic lens 11 and outputs image data. In the recording medium 64, which is detachably loaded into the electronic camera 10, image data output from the image sensor 62 are recorded as explained earlier. The switch group 63 includes the operation members 19, the shutter release button 14, the mode selector dial 15, the main switch 16 and the like. The drive device 66 controls drive of the photographic lens 11 by retracting or extending the lens via a drive mechanism (not shown).

The control device 61 switches to the mode corresponding to a specific operation at the mode selector dial 15 and controls various devices as required in the selected mode. It is to be noted that any type of control executed in the electronic camera 10 equipped with a projector in the following description is actually executed at the control device 61.

Figure 3:
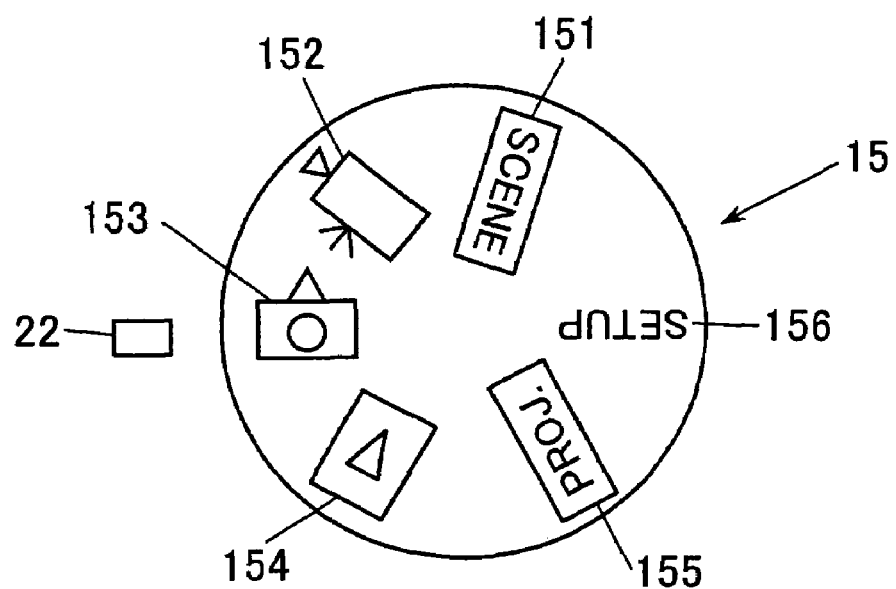
FIG. 3 is an enlarged view of the mode selector dial.

FIG. 3 is an enlarged view of the mode selector dial 15. The mode selector dial 15 bears characters 151 indicating a scene mode, a mark 152 indicating a dynamic image photographing mode, a mark 153 indicating a still image photographing mode, a mark 154 indicating the reproduction mode, a mark 155 indicating that projection mode and a mark 156 indicating a setup mode.

A click mechanism (not shown) is disposed at the mode selector dial 15 so as to hold one of the marks 151 to 156 at a position aligned with the index 22. As the mode selector dial 15 is rotated while the main switch 16 is in an ON state, the operation mode corresponding to the mark on the mode selector dial 15, which becomes held at the position aligned with the index 22 at the end of the rotation, is selected in the electronic camera 10 equipped with a projector. Among the operation modes listed earlier, the scene mode, the dynamic image photographing mode and the still image photographing mode are operation modes selected for the photographing system, whereas the reproduction mode and the projection mode are operation modes selected for the reproduction system. The speaker 21 is engaged for audio reproduction as explained earlier when an operation mode of the reproduction system is selected.

In the scene mode, an image is photographed by automatically controlling the exposure, the focus, the flash output and the like in correspondence to the type of scene being photographed, e.g., landscape photographing, night scene photographing or backlit photographing. A photographing instruction is issued as the shutter release button 14 is depressed. In the dynamic image photographing mode, the camera is engaged in dynamic image photographing as the shutter release button 14 is depressed. In the still image photographing mode, the camera is engaged in still image photographing as the shutter release button 14 is depressed. The photographing conditions such as the exposure, the focus and the flash output in the dynamic image photographing mode and the still image photographing mode are controlled based upon the details of the settings selected in advance through a setting operation at the operation members 19.

In the reproduction mode, image data having been obtained through a previous photographing operation are read out from the recording medium 64 and an image reproduced based upon these image data is displayed at the liquid crystal display unit 17. In the projection mode, image data resulting from a previous photographing operation are read out from the recording medium 64 and an image reproduced based upon these image data is projected through the projection window 13. In the setup mode, various functions are set in the electronic camera 10 equipped with a projector.

It is to be noted that after the mark 155 at the mode selector dial 15 is held at the position aligned with the index 22, a predetermined length of wait time (e.g., 0.5 sec) is allowed to elapse before the operation mode is switched to the projection mode in the electronic camera 10 equipped with a projector. Thus, even if the mark 155 (projection mode) at the mode selector dial 15 is momentarily aligned with the index 22 while the user is rotating the mode selector dial to switch to the setup mode (mark 156), no image is projected through the projection window 13 in response.

It is to be noted that upon detecting that the mode selector dial 15 has been rotated to engage the electronic camera 10 equipped with a projector in projection mode operation, the drive device 66 may be controlled so as to retract the photographic lens 11 via the drive mechanism (retracting mechanism, not shown).

The following advantages are achieved in the first embodiment described above.

(1) The mode selector dial 15 includes a projection mode setting (mark 155), so that the projection mode for projecting a reproduced image toward a screen or the like through the projection window 13, as well as the reproduction mode for displaying a reproduced image at the liquid crystal display unit 17 and any photographing mode can be selected simply by rotating the mode selector dial 15. Since the projection mode can be selected without having to add a special switch in the electronic camera equipped with the projection device, the camera operations do not become complicated or the cost of the electronic camera does not increase.

(2) The marks on the mode selector dial 15 are classified and disposed in correspondence to the operations in the photographing system (the marks 151 through 153) and the operations in the reproduction system (the marks 154 and 155) in a user-friendly presentation to ensure good operability. In particular, since the reproduction mode setting and the projection mode setting are set next to each other, the user is able to choose to project a reproduced image on a screen or the like or to display the reproduced image at the liquid crystal display unit 17 with ease.

(Example of Variation)

Figure 4:
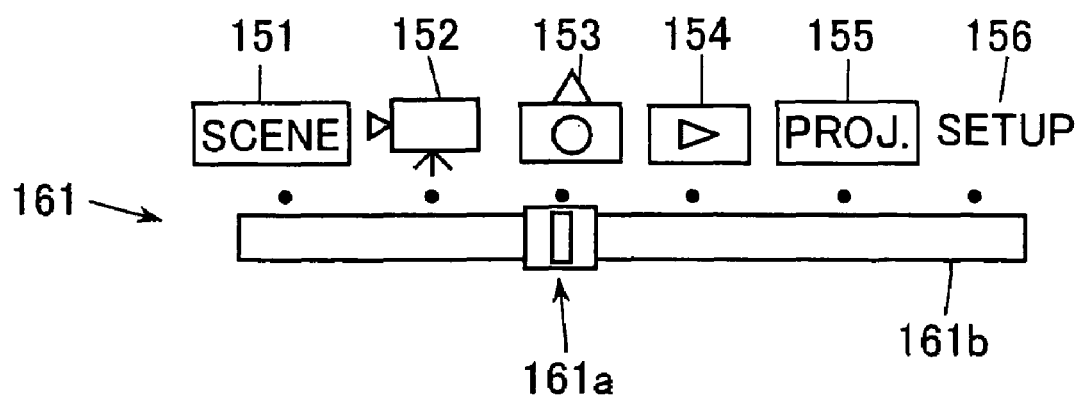
FIG. 4 presents an example of a sliding operation member.

Instead of the mode selector dial 15, a specific operation mode may be selected via a sliding operation member shown in FIG. 4. The sliding operation member 161 in FIG. 4 includes an operation lever 161a which is allowed to move to the left or the right in FIG. 4 along a guide 161b. Next to the guide 161b, the marks 151 through 156 each corresponding to a specific operation mode as explained earlier and indices (filled circles) are disposed. A click mechanism (not shown) is disposed at the sliding operation member 161 so that the operation member 161a is allowed to stop at a position aligned with any of the indices corresponding to the individual marks. As the operation lever 161a is slid to a specific position while the main switch 16 is in an ON state, the operation mode corresponding to the mark aligned with the position of the operation lever 161a is selected in the electronic camera 10 equipped with a projector.

Second Embodiment

The mode selector dial 15 in the second embodiment only bears the mark 154 in correspondence to the reproduction system and it does not bear the mark 155. As the mode selector dial 15 is rotated while the main switch 16 is in an ON state and the mark 154 is held at the position aligned with the index 22, the operation mode in the electronic camera 10 equipped with a projector is switched to the reproduction mode.

The electronic camera will normally include a display switching operation member operated to switch the display on/off at the liquid crystal display unit 17. In the electronic camera 10 equipped with a projector achieved in the second embodiment, the projection mode for projecting image information is selected via the display switching operation member. A reproduction switching button 19A in the embodiment is equivalent to the display switching operation member.

As the reproduction mode is selected in the electronic camera 10 equipped with a projector, a reproduced image is displayed as an initial display at the liquid crystal display unit 17 (projection via the built-in projection device is in an OFF state). As the reproduction switching button 19A is pressed, the built-in projection device in the electronic camera 10 equipped with a projector projects the reproduced image through the projection window 13 and the display at the liquid crystal display unit 17 is turned off. As the reproduction switching button 19A is pressed again, the projection by the built-in projection device through the projection window 13 is turned off (the display at the liquid crystal display unit 17 sustains an OFF state) in the electronic camera 10 equipped with a projector. Under these conditions, only the sound is reproduced without reproducing the image. The electronic camera 10 equipped with a projector may include an output terminal through which an image signal corresponding to an image photographed via the photographic lens 11 is output to an external monitor via a cable. Upon detecting that a cable is connected to the output terminal, the image signal is output through the output terminal at the electronic camera 10 adopting such a structure. In this case, even when the display at the liquid crystal display unit 17 and the projected display via the built-in projector are both in an OFF state, an image can be reproduced and the sound can also be reproduced at the external monitor.

As the reproduction switching button 19A is pressed yet again, the reproduced image is brought back on display at the liquid crystal display unit 17 in the electronic camera 10 equipped with a projector (the projection by the built-in projection device sustains an OFF state). Thus, each time the reproduction switching button 19A is pressed, the reproduced image display is cyclically switched to; reproduced image display at the liquid crystal display unit 17 -> reproduced image projection by the built-in projection device -> the liquid crystal display unit 17 and the built-in projection device both off -> reproduced image display at the liquid crystal display unit 17 -> . . . .

The following advantages are achieved in the second embodiment described above.

(1) The mode for displaying a reproduced image at the liquid crystal display unit 17 or the mode for projecting a reproduced image via the built-in projection device can be selected as the reproduction mode, and the reproduced image display at the liquid crystal display unit 17 or the reproduced image projection via the built-in projection device can be selected with ease simply by pressing the reproduction switching button 19A. Since the projection mode can be selected without having to add a special switch in the electronic camera equipped with the projection device, the camera operations do not become complicated or the cost of the electronic camera does not increase.

(2) The mode for displaying a reproduced image at the liquid crystal display unit 17 and the mode for projecting a reproduced image via the built-in projection device are united to the reproduction mode and, as a result, a user-friendly camera, which the user can operate intuitively, is provided. More specifically, the user is able to choose whether to project a reproduced image onto a screen or the like or to display it at the liquid crystal display unit 17 with ease.

(Example of Variation)

The display may be cyclically switched in response to depression of the reproduction switching button 19A as described below, instead. Namely, the reproduced image display may be cyclically switched so that; display of a reproduced image, photographing information and the like at the liquid crystal display unit 17 -> display of the reproduced image alone at the liquid crystal display unit 17 -> projection of the reproduced image, the photographing information and the like via the built-in projection device -> projection of the reproduced image alone via the built-in projection device -> both the liquid crystal display unit 17 and the built-in projection device off -> display of the reproduced image, the photographing information and the like at the liquid crystal display unit 17 . . . . The photographing information and the like include photographing date information indicating the date on which the image was photographed and information indicating the name (number) assigned to the file in which the image data are recorded.

Third Embodiment

Figure 5:
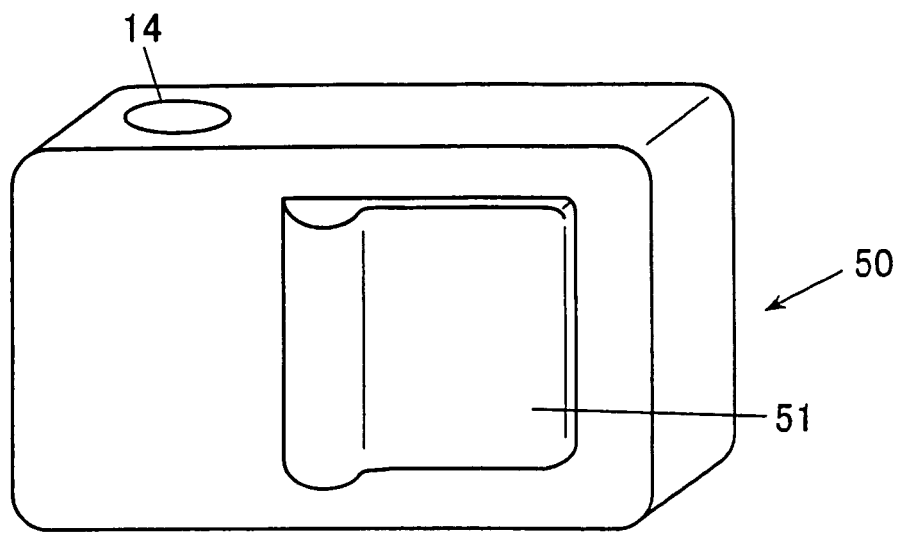
FIG. 5 is a perspective of the electronic camera equipped with a projector, which is achieved in a third embodiment of the present invention, viewed from the front side.
Figure 6:
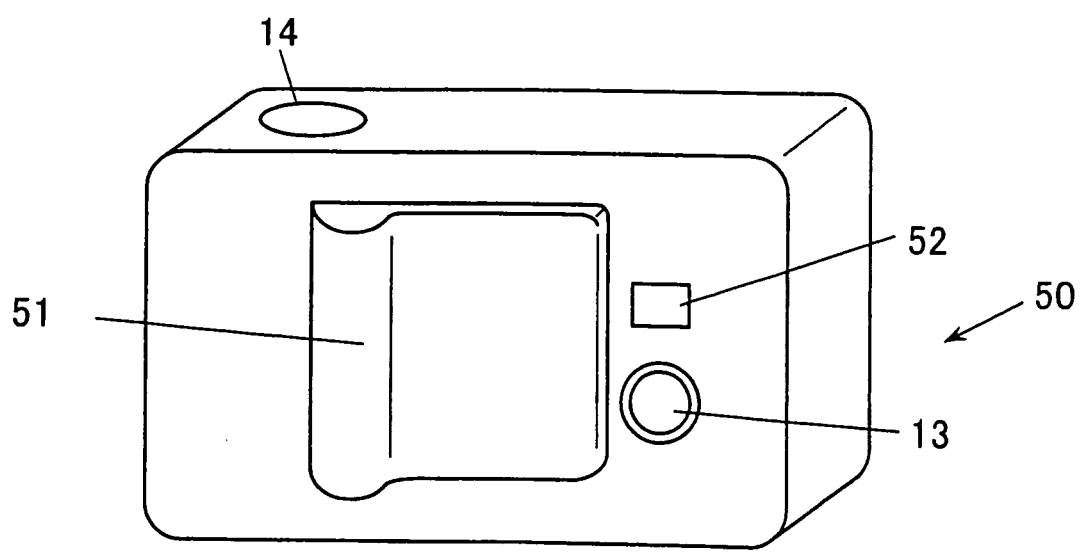
FIG. 6 is a perspective of the electronic camera equipped with a projector, which is achieved in the third embodiment of the present invention, viewed from the front side.
Figure 7:
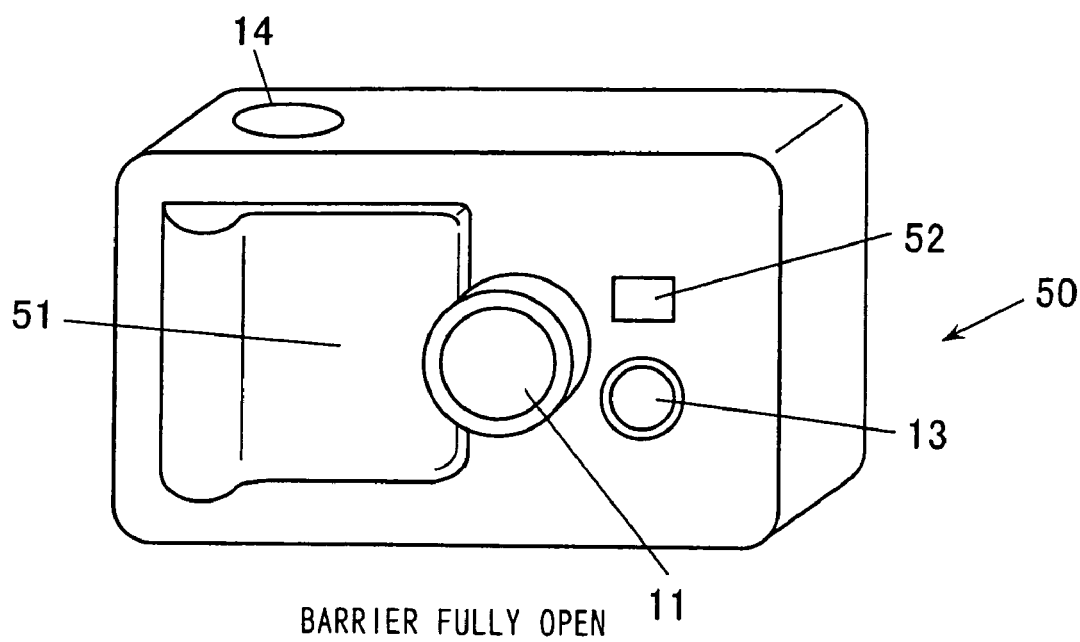
FIG. 7 is a perspective of the electronic camera equipped with a projector, which is achieved in the third embodiment of the present invention, viewed from the front side.

FIGS. 5 through 7 each present a perspective of the electronic camera equipped with a projector achieved in the third embodiment of the present invention, viewed from the front side. FIG. 5 shows that a movable barrier 51 is disposed on the front side of an electronic camera 50 equipped with a projector. When the electronic camera 50 equipped with a projector is not in use, the movable barrier 51 is set at the closed position, as shown in FIG. 5.

The movable barrier 51 functions both as the main switch of the electronic camera 50 equipped with a projector and a mode switching operation member, as well as a protective member. As the movable barrier 51 is slid to the half-open position, as shown in FIG. 6 in the electronic camera 50 equipped with a projector, power-on processing is executed (the camera is started up) and the projection mode is selected as the operation mode in the electronic camera 50 equipped with a projector. As the movable barrier 51 moves to the half-open position, the projection window 13, at least, becomes exposed. In other words, when the movable barrier 51 assumes the half-open position, the projection window is no longer protected. The reproduced image is thus projected through the exposed projection window 13 in the electronic camera 50 equipped with a projector. It is to be noted that while an optical viewfinder objective window 52 is exposed when the movable barrier 51 is at the half-open position in the example presented in FIG. 6, it is not strictly necessary for the optical viewfinder objective window 52 to be in an exposed state at this point in time.

As the movable barrier 51 is slid to the full open position, as shown in FIG. 7, the operation mode is switched from the projection mode to the photographing mode in the electronic camera 50 equipped with a projector. When the movable barrier 51 assumes the full open position, the photographic lens 11 is exposed. Namely, when the movable barrier 51 is at the full open position, the photographic lens is no longer protected. At this setting, projection via the built-in projection device is turned off and the photographic lens 11 having been retracted by the retracting mechanism (not shown) is driven out in the electronic camera 50 equipped with a projector. As the shutter release button 14 is pressed in the photographing mode, a photographing operation is executed in the electronic camera 50 equipped with a projector.

As the movable barrier 51 is slid toward the half-open position, the sliding operation is detected with a microswitch (not shown) and the drive device 66 is controlled so as to retract the photographic lens 11 via the drive mechanism (retracting mechanism, not shown) in the electronic camera 50 equipped with a projector. As the movable barrier 51 is further slid toward the half open position, as shown in FIG. 6, after the photographic lens 11 is retracted, the operation mode is switched from the photographing mode to the projection mode in the electronic camera 50 equipped with a projector, and the reproduced image is projected through the exposed projection window 13.

As the movable barrier 51 is further slid toward the closed position, as shown in FIG. 5, the projection through the projection window 13 is turned off, power-off processing is executed and the camera operation ends in the electronic camera 50 equipped with a projector.

It is to be noted that a predetermined length of wait time (e.g., one sec) is allowed to elapse after the movable barrier 51 stops at the half-open position. Following the 1-sec wait period, the operation mode is switched to the projection mode in the electronic camera 50 equipped with a projector. Thus, if the movable barrier 51 passes through the half-open position momentarily while the user is sliding the movable barrier, the projection image is not projected through the projection window 13 in response.

The following advantages are achieved in the third embodiment described above.

(1) The sliding type movable barrier 51, which protects the photographic lens 11 and the projection window 13, is also used as the main switch and the mode switching operation member. Since the projection mode can be selected without having to add a special switch in the electronic camera equipped with the projection device, the camera operations do not become complicated or the cost of the electronic camera does not increase.

(2) As the movable barrier 51 moves to the half-open position, the projection window 13 becomes exposed, and the operation mode is switched to the projection mode. Since the operating state (the projection window 13 is exposed) at the electronic camera 50 equipped with a projector directly reflects the actual operation mode (projection mode), the user is able to operate the camera intuitively.

(3) As the movable barrier 51 moves to the full open position, the photographic lens 11 becomes exposed and the operation mode is switched to the photographing mode. Since the operating state (the photographic lens 11 is exposed) at the electronic camera 50 equipped with a projector directly reflects the actual operation mode (photographing mode) the user is able to operate the camera intuitively.

As described above, in the electronic camera equipped with a projector according to the present invention, the photographing operation mode and the projection operation mode can be selected by operating a single operation member, or projection via the projecting means in the reproduction operation mode can be turned on or off by operating the operation member used to turn on/off the display at the display means. As a result, the projection mode can be selected with ease without having to add another operation member in the electronic camera.

The above described embodiments are examples and various modifications can be made without departing from the spirit and scope of the invention.

What is claimed is:

1. An electronic camera, comprising:
an image sensor that captures an image of a subject and outputs image data;
a projection device that projects an image based upon image data;
a display device at which an image is displayed based upon image data;
a single mode switching operation member settable by a user of the camera to different operation positions to select different operation modes, respectively; and
a control device that selects one of a photographing operation mode in which image data output by the image sensor are saved into a recording medium, a projection operation mode in which an image is projected by the projection device based upon image data read out from the recording medium, and a reproduction operation mode in which an image is displayed at the display device based upon image data read out from the recording medium, in correspondence to an operation position to which the single mode switching operation member is set, wherein
the single mode switching operation member includes operation positions arranged in order of an operation position corresponding to the photographing operation mode, an operation position corresponding to the reproduction operation mode and an operation position corresponding to the projection operation mode, and
the operation position corresponding to the projection operation mode and the operation position corresponding to the reproduction operation mode are arranged adjacent to each other.

2. An electronic camera comprising:
a photographic lens,
an image sensor that captures an image of a subject and outputs image data;
a projection device that projects light through a projection window to thereby project an image based upon image data;
a single mode switching operation member comprising a protective member that protects the photographic lens and the projection window, wherein the protective member is operable to be in a position at which the projection window is no longer protected, and in a different position at which the photographic lens is no longer protected; and
a control device that selects a projection operation mode in which an image is projected by the projection device based upon image data read out from a recording medium when the protective member is operated to be in the position at which the projection window is no longer protected, and selects a photographing operation mode in which image data output by the image sensor are saved into the recording medium when the protective member is operated to be in the position at which the photographic lens is no longer protected.

3. An electronic camera according to claim 2, wherein:
the control device selects the projection operation mode when the protective member is operated to be in a position at which the projection window is no longer protected but the photographic lens is still protected, and selects the photographing operation mode when the protective member is operated to be in a position at which neither the projection window nor the photographic lens is protected.

4. An electronic camera, comprising:
an image sensor that captures an image of a subject and outputs image data;
a projection device that projects an image based upon image data;
a display device at which an image is displayed based upon image data;
an operation member; and
a control device that selects a photographing operation mode in which image data output by the image sensor are saved in a recording medium or a reproduction operation mode in which an image is either projected via the projection device or displayed at the display device based upon image data read out from the recording medium, wherein:
the control device selects an ON or OFF state for projection by the projection device and selects an ON or OFF state for display at the display device in response to an operation signal output from the operation member while the reproduction operation mode is currently selected.

5. An electronic camera according to claim 4, wherein:
the operation member is operated to selects an ON or OFF state for display at the display device when a mode other than the reproduction operation mode is selected.

6. An electronic camera according to claim 4, wherein:
each time the operation member is operated, the control device selects an OFF state for projection by the projection device and an ON state for display at the display device, an ON state for projection by the projection device and an OFF state for display at the display device, or an OFF state for projection by the projection device and an OFF state for display at the display device.

7. An electronic camera according to claim 1, further comprising:
a photographic lens; and
a drive device that drives the photographic lens, wherein:
as a switchover to the projection operation mode is detected, the control device controls the drive device to retract the photographic lens.

8. An electronic camera according to claim 7, wherein:
as a movement or an operation of the single mode switching operation member to the operation position corresponding to the projection operation mode is detected, the control device controls the drive device so as to retract the photographic lens.

9. An electronic camera according to claim 2, further comprising:
a drive device that drives the photographic lens, wherein:
as a movement of the protective member from the position at which the photographic lens is not protected to the position at which the photographic lens is protected is detected, the control device controls the drive device so as to retract the photographic lens.

10. An electronic camera according to claim 1, wherein the control device selects the projection operation mode after the single mode switching operation member is set to the operation position corresponding to the projection operation mode for a predetermined length of time.

11. An electronic camera according to claim 4, wherein, when the control device has selected the reproduction operation mode, the control device first selects an OFF state for projection by the projection device and selects an ON state for display at the display device.

12. An electronic camera according to claim 4, wherein, when the control device has selected the reproduction operation mode, the control device first selects an OFF state for projection by the projection device and selects an ON state for display at the display device, and then selects an ON state for projection by the projection device and selects an OFF state for display at the display device in response to a next operation signal output from the operation member.

13. A camera comprising:
a dial which is rotated by a user of the camera to a photographic mode position to thereby cause the camera to obtain image data by an image sensor and store the obtained image data in a recording medium, to a projection mode position to thereby cause the camera to project an image from the camera based upon image data read out from the recording medium, and to a reproduction operation mode position to thereby cause the camera to display an image on a display on camera based upon image data read out from the recording medium, wherein the photographic mode position, the reproduction operation mode position and the projection mode position arranged on the dial in the order of the photographic mode position, the reproduction operation mode position and the projection mode position, with the projection mode position and the reproduction operation mode position adjacent to each other on the dial.

* * * * *

UNITED STATES PATENT AND TRADEMARK OFFICE
CERTIFICATE OF CORRECTION

| | | |
|---|---|---|
| PATENT NO. | : 7,519,290 B2 | Page 1 of 1 |
| APPLICATION NO. | : 11/324217 | |
| DATED | : April 14, 2009 | |
| INVENTOR(S) | : Hirotake Nozaki | |

It is certified that error appears in the above-identified patent and that said Letters Patent is hereby corrected as shown below:

Title Page, Column 2 Item 56, Line 7, change "396/419" to --396/429--.

Signed and Sealed this

Thirtieth Day of June, 2009

JOHN DOLL
*Acting Director of the United States Patent and Trademark Office*